June 27, 1967 R. A. NAEGELE 3,328,677
THERMISTOR DETECTOR
Filed April 16, 1964 2 Sheets-Sheet 1

INVENTOR.
Robert A. Naegele,
BY
Wolfe, Hubbard, Voit & Osann
Attorneys.

United States Patent Office 3,328,677
Patented June 27, 1967

3,328,677
THERMISTOR DETECTOR
Robert A. Naegele, Maywood, Ill., assignor to J. E. Watkins Co., Maywood, Ill., a corporation of Illinois
Filed Apr. 16, 1964, Ser. No. 360,273
4 Claims. (Cl. 323—68)

This invention relates generally to control systems, and more particularly to controls for sensing and regulating liquid level in a vessel.

The principal object of the present invention is to provide sensing devices which are capable of detecting changes in condition of a surrounding medium by responding to changes in the heat transfer characteristics of the surrounding medium, and which embody no moving parts; are operative over wide ranges of temperature; operate independently of the absolute temperature of the surrounding medium; operate in liquid or gas as the surrounding medium; sense changes in condition including changes in state and changes in temperature of the surrounding medium; are fast to respond; require no adjustments; are rugged and durable; and embody a minimum of parts.

A control for maintaining liquid level in a vessel is disclosed in U.S. Patent No. 3,029,354, dated Apr. 10, 1962. In certain of its aspects the present invention is directed to improvements on the liquid level control disclosed in said patent. As disclosed in said patent, in order to make a conventional thermostat responsive to level change, a heater and separate heater control is employed for establishing and maintaining the thermostat at a reference temperature while it is covered with liquid, and for heating up the thermostat when the liquid level drops to expose the thermostat, the control being responsive to the warming effect to regulate the liquid level.

One of the objects of the present invention is to combine thermoelectric devices to form a level sensing element, one of such devices being effective to establish and maintain the other device at a reference temperature, the combined devices forming the element being responsive to changes in condition of the surrounding medium reflected in changes in the heat transfer characteristics of the medium.

A further object is to provide a liquid level sensing device capable of indicating level change responsive to gradual immersion of the sensing device and the resultant change in heat transfer characteristic of the medium surrounding the device as it changes between gas and liquid.

Another object is to provide a temperature sensitive device capable of indicating temperature change due to changes in heat transfer to the surrounding medium upon change in temperature thereof.

A further object of the present invention is to provide a temperature sensitive switching device which is highly responsive, yet requires no adjustment whatsoever once in use, thereby permitting the probe to be permanently sealed against fluid leakage. No adjustments are thus required in the temperature sensitive elements to maintain the operative mechanism nor is it necessary to remove and dismantle the probe in which the apparatus is embodied.

It is another object to provide a temperature sensitive switching device which is greatly simplified, requiring a minimum of parts, none of which move in operation, and all of which are relatively inexpensive so as to provide an accurate long-lasting fluid level control which is of relatively low cost.

These and other objects and advantages will become more apparent from a reading of the detailed description hereinafter provided, and taken in conjunction with the appended drawing wherein.

Figure 1:
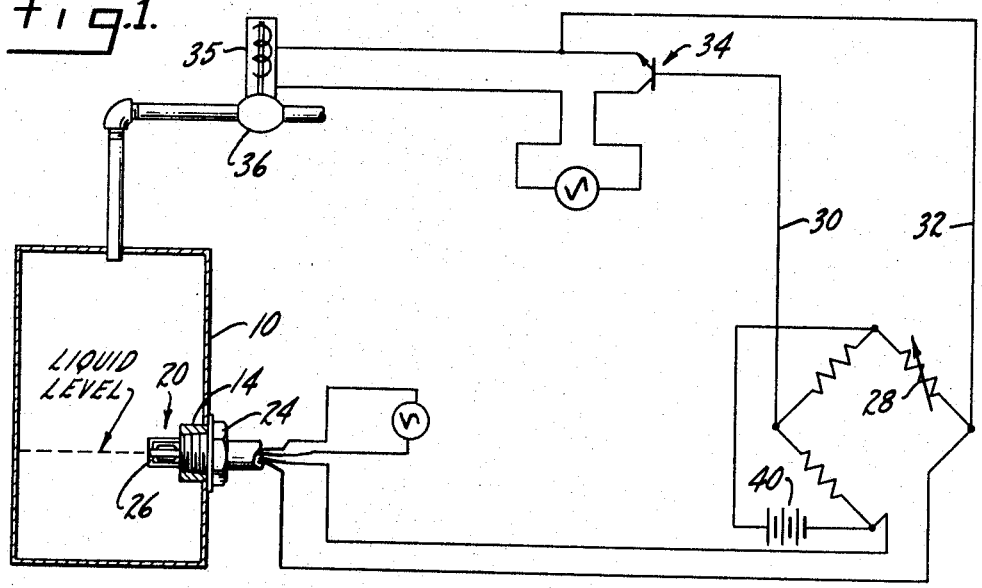
FIGURE 1 is an exemplary fluid level control circuit and fluid container sectioned to indicate the use of a fluid level sensing element constructed in accordance with the present invention.

While the invention is susceptible of various modifications and alternative forms, certain specific embodiments thereof are shown by way of example in the drawings and will herein be described in detail. It should be understood, however, that it is not intended to limit the invention to the particular forms disclosed, but, on the contrary, the intention is to cover all modifications, equivalents and alternatives falling within the spirit and scope of the invention as expressed in the appended claims.

Referring to the drawings, there is shown in FIG. 1 a preferred form of the present invention, herein illustrated as a control system for regulating the level of fluid in the container 10. This system includes an element 20 mounted in the wall of the container so as to be contacted by the fluid for sensing changes in the level of liquid about the element as the level rises to immerse or drops to expose the element. In keeping with the invention, the element 20 thus serves as a device for sensing changes in the condition of a surrounding medium, illustratively changes in the level of liquid refrigerant in the container 10.

Figure 3:
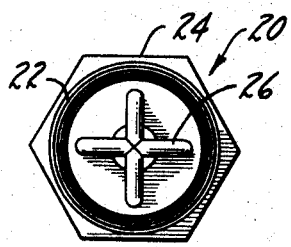
FIG. 3 is an end view of the element of FIG. 2.
Figure 2:
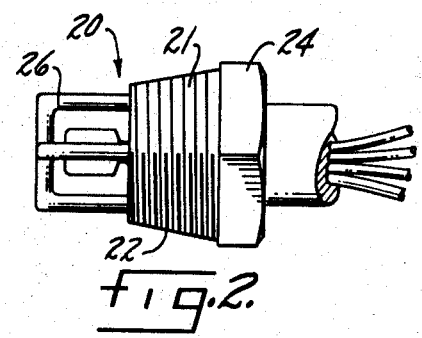
FIG. 2 is a side elevation of an element constructed in accordance with the present invention.
Figure 1A:
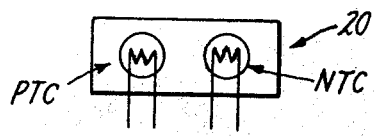
FIG. 1a is a schematic illustration of the fluid level sensing element, per se.
Figure 5:
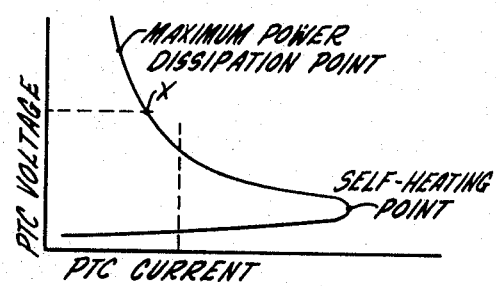
FIG. 5 is a typical voltage current response curve for a PTC thermistor.

In keeping with the invention, the element 20, as shown in FIGURE 1a includes a heat emitting thermistor, herein shown as a positive temperature coefficient thermistor (PTC), which establishes and maintains a switching thermistor, herein shown as a negative temperature coefficient thermistor (NTC), at a reference temperature. In this manner the resistance of the NTC thermistor is maintained at a predetermined value, illustratively X' in FIG. 4, by means of the heat emitting PTC thermistor. A voltage X in FIG. 5 is applied to the input terminals of the PTC thermistor to produce operation of the latter at the point X in FIG. 4. As shown in FIGS. 2 and 3, the sensing element 20 has a threaded shank 21 so that element may be fastened within a threaded opening in a boss 14 on the side of the container 10. A guard 26 protects the thermoelectric components of the sensing element which components are mounted immediately adjacent each other in a probe 22 within the guard.

Figure 4:
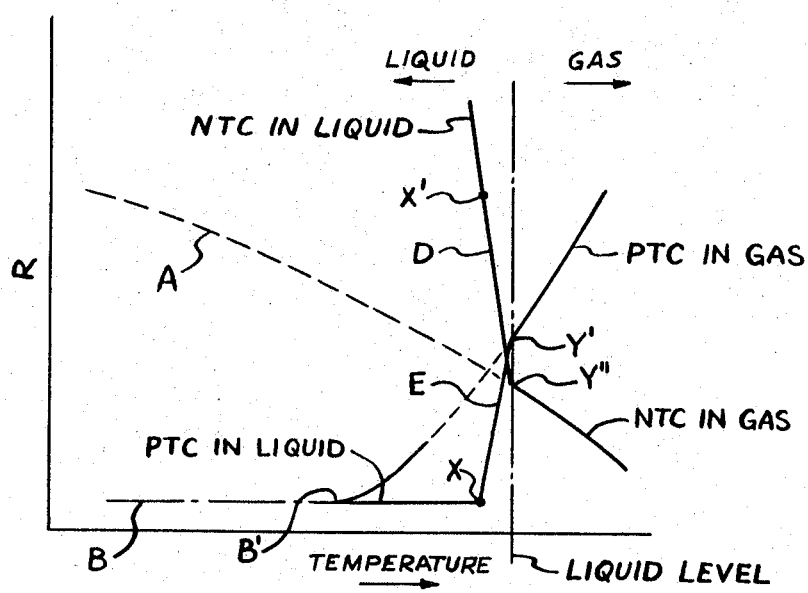
FIG. 4 is a graphic representation of the characteristics of the exemplary thermistors employed in the element of FIG. 2.

The curves in FIG. 4 illustrate graphically what occurs as the sensing element is exposed to changes in condition of the surrounding medium. These curves also illustrate the characteristics of typical NTC and PTC thermistors in being exposed to changing conditions. For example, the curve A in FIG. 4, (including a broken portion A and a solid portion designated "NTC in gas") depicts decrease in resistance upon increase in temperature for an NTC thermistor which has been found suitable for use in the sensing element 20. It will be seen that when this NTC thermistor is exposed to gas or atmosphere, and its temperature is gradually increased, its resistance gradually decreases. Curve B (including a broken portion marked B and a solid portion marked "PTC in gas") illustrates graphically that with a PTC thermistor exposed to gas or atmosphere, upon increase in its temperature there is no substantial change in resistance until a switching point B' is reached after which as the temperature is increased, the resistance increases gradually and then rapidly.

When the two thermistors, the NTC and PTC, are embodied in a sensing element 20, which is mounted in a container 10 as illustrated in FIG. 1, so long as the liquid level is below the sensing element the two thermistors will be exposed to gas above the liquid. As the temperature of the two thermistors in the element is decreased, as by adjusting the voltage applied to the PTC heater element of the assembly, it will be seen from the curves in FIG. 4 that the resistance of the NTC thermistor gradually increases while the resistance of the PTC thermistor rapidly decreases.

If the temperature of these two thermistors in the sensing element were held at a point just above Y' in FIG. 4, and the liquid level in the container was raised to gradually immerse the two thermistors, it will be recognized that the heat emitted by the PTC thermistor will be rapidly and virtually completely dissipated to the fluid instead of heating the NTC thermistor as took place with the sensing element before immersion. The gradual immersion of the element 20 will have the effect of rapidly dropping the temperature of the sensing element 20, which is graphically depicted by the curves D and E in FIG. 4, and this rapid reduction in temperature will have the effect of rapidly increasing the resistance of the NTC thermistor and decreasing the resistance of the PTC thermistor. The control circuit in FIG. 1 may be arranged so as to respond to the rapid change in resistance of the NTC thermistor which occurs upon gradual immersion in the liquid in the container 10 as explained heretofore.

Preferably, however, the control circuit in FIG. 1 is arranged so that the heating effect of the PTC thermistor established at the point X in FIG. 5 holds the temperature of the NTC thermistor of the sensing element at the point X' in FIG. 4. In this manner, the temperature of the sensing element 20 is established a small increment above the temperature of the liquid to be controlled, which in the case of the application illustrated in FIG. 1, is liquid refrigerant for a refrigeration system. It will be seen from FIG. 5 that the voltage X applied to the PTC thermistor is in its self-heat range, and hence it becomes a source of heat or heater. It is this effect that is employed in the sensing element combination with the NTC thermistor to maintain the NTC thermistor at a temperature just above the temperature of the liquid refrigerant. As also can be observed from FIG. 4, however, substantial changes in resistance of both the NTC and PTC thermistors will occur upon drop in liquid level in the container to partially or fully expose the sensing element.

Taking the NTC thermistor, for example, the resistance of this device will drop drastically from the point X' along the curve D to the point Y", and then will drop gradually along the gas curve for the NTC thermistor as the temperature continues to rise due to the heating effect of the PTC thermistor with the sensing element exposed to the gas above the liquid.

Referring now to the curves for the PTC thermistor, a similarly drastic change in resistance values occurs. The resistance of the PTC thermistor will increase rapidly from the point X along the curve E to the point Y', and once the sensing element is exposed to gas as the liquid level drops thereafter along the PTC curve in gas. The rapid increase in resistance of the PTC thermistor affords self-controlled current cut-off of the heater element. Thus, no separate current limiting controls are required and the circuit is self-regulating.

In the control circuit of FIG. 1, as mentioned above, the rapid change in resistance of the NTC thermistor which occurs as the condition of the surrounding medium changes from liquid to gas is utilized in the preferred form of this invention to actuate a control to regulate the level of fluid in the container 10. Thus the NTC thermistor is connected as shown in FIG. 1 in a bridge circuit having a variable resistance 28 which may be set to balance the bridge with the NTC thermistor operating at the point X' in FIG. 4 and having the predetermined fixed resistance for this point of operation. As the liquid falls to expose the sensing element, and the warming effect of the PTC thermistor causes a rapid decrease in the resistance of the NTC thermistor, the bridge circuit will become unbalanced. Responsive thereto, the solid state relay 34 is made conductive, and the solenoid 35 is energized to open the valve 36 for flow from a source of liquid refrigerant through the valve 36 to the container 10 to raise the level of liquid refrigerant therein until it covers or immerses the sensing element 20. The temperature drop resulting therefrom will have the effect of reducing the temperature of the sensing element until the NTC thermistor is at the point X', the PTC thermistor is at the point X, and the bridge becomes balanced. This will shut off the flow of liquid refrigerant into the container 10 until the liquid level drops due to liquid refrigerant draw off.

It will be appreciated that the resistor 28 may be set to either balance the bridge with the NTC thermistor and the PTC thermistor at the control points X', X, respectively, so that changes in the condition thereof will unbalance the bridge, or the bridge may be initially unbalanced to be brought into balance by changes in condition of the surrounding medium such as drop in liquid level to expose the sensing element 20. In keeping with the present invention, such changes are employed to change the bridge circuit output to regulate liquid level in the container 10.

One of the features of the invention is that when the heat absorbing fluid drops to a level below the element 20 thus causing the element 20 to rise in temperature, neither the element nor its internal heat sensitive parts will burn up or otherwise become damaged by excessive heat. The temperature is limited by the increase in resistance of the PTC thermistor, resulting from a fall in fluid level even through the NTC thermistor offers less resistance to current as temperature increases, Since the power output of the PTC thermistor is self-limiting at a level not significantly greater than its normal operating output as shown by FIG. 5, the NTC thermistor will not be overheated.

While a preferred form of the invention, described hereinbefore and as illustrated in FIG. 1, is applied to a liquid level control particularly with respect to a refrigeration system wherein liquid refrigerant is at a moderately low temperature, it will be appreciated that the principles of the invention are applicable to control of other conditions of a surrounding medium, or merely to provide a device or system for sensing variations in conditions of a surrounding medium. Thus, according to this invention a device is provided comprising a sensing element and a conditioning element, wherein the sensing element responds to variations in the surrounding medium which change the heating or cooling effect of the conditioning element on the sensing element.

Figure 6:
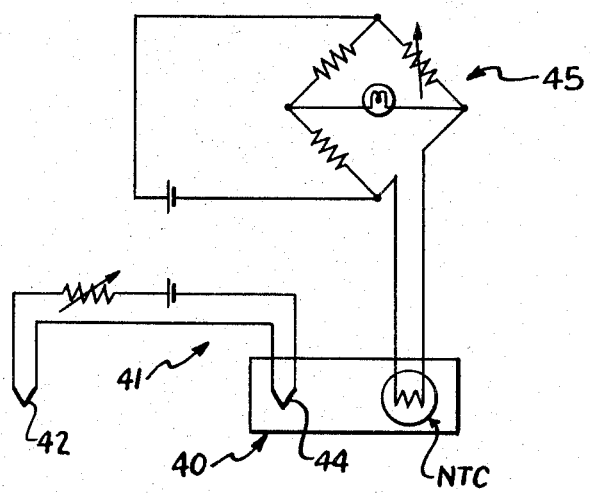
FIG. 6 is an alternative exemplary fluid level control circuit including a thermistor and thermocouple combined to form the fluid level sensing element.

For example, a further application of the principles of the present invention is shown in FIG. 6. As illustrated in this figure, the sensing element 40 embodies an NTC thermistor and elements of a thermocouple 41. The sensing element is especially suited to detect changes in liquid level of a cryogenic fluid in a storage vessel therefor where a prime objective is to reduce or eliminate introduction of heat into the storage vessel to avoid fluid boil off. In this application of the invention, the sensing element is responsive to changes in the rate of heat transfer to the sensing element from the surrounding medium. To this end, the hot junction 42 of the thermocouple is maintained at the temperature of the cryogenic fluid in the storage vessel, as by mounting the same in the storage vessel wall adjacent the bottom of the vessel. The cold junction 44 of the thermocouple 41 forms part of the sensing element 40 and is mounted immediately adjacent the NTC thermistor such that upon application of a voltage across the terminals of the thermocouple, the temperature of the cold junction will be lowered below the temperature of the hot junction of the thermocouple and hence below the temperature of the cryogenic fluid. Being arranged in the sensing element 40 in immediate association with the NTC thermistor, the effect will be to lower the temperature of the NTC thermistor to a point just below that of the surrounding medium, herein the cryogenic fluid such as liquid oxygen or nitrogen. In this case where the surrounding medium is liquid, which is an effective conductor of heat to the sensing element, the temperature of the sensing element will be maintained close to the temperature of the cryogenic fluid. Upon drop in liquid level in the container so as to partially or fully expose the sensing element, the temperature thereof will be affected by the decreased rate of heat transfer to the sensing element from the surrounding medium which is now gas in the atmosphere above the cryogenic fluid, producing a rapid drop in the temperature of the sensing element. This drop in temperature of the sensing element including the NTC thermistor will produce an increase in resistance thereof which will follow a curve like the curve D in FIG. 4 for the NTC thermistor of the element 20. In keeping with the invention, this rapid increase in resistance of the NTC thermistor responsive to change in the heat transfer characteristics of the surrounding medium about the sensing element is utilized in the control circuit of FIG. 6 to signal this change of condition. Thus, the increase in resistance of the NTC thermistor may be employed to balance or unbalance a bridge circuit 45 and through the control circuit to automatically regulate the liquid level in the storage vessel, or to energize a signal light, or to perform any other control or indicating function as desired.

I claim as my invention:

1. In a system for detecting changes in condition of a surrounding medium, including means for energizing a thermoelectric heating element and means for detecting changes in resistance of a negative temperature coefficient thermoelectric resistance element, both said elements being disposed (i) in heat transfer proximity to each other and (ii) in said surrounding medium, the improvement whereby the heat output of said heating element is self-limited to thereby avoid damage by excessive heat, which comprises a probe for said system including:
    (a) a negative temperature coefficient thermistor as said resistance element, said thermistor having a characteristic of rapidly decreasing resistance with increasing temperature, and
    (b) a positive temperature coefficient thermistor as said heating element, said thermistor having a characteristic of substantially constant resistance below a switching point temperature and a rapidly increasing resistance with increasing temperature above a switching point temperature whereby the heat output of said thermistor is self-limited.

2. A device for detecting changes in condition of a surrounding medium comprising, in combination:
    (a) a probe containing thermoelectric elements, including
        (i) a negative temperature coefficient thermistor having a characteristic of rapidly decreasing resistance with increasing temperature, and
        (ii) a positive temperature coefficient thermistor having a characteristic of substantially constant resistance below a switching point temperature and a rapidly increasing resistance with increasing temperature above said switching point temperature,
        (iii) said positive temperature coefficient thermistor being disposed in heat transfer proximity to said negative temperature coefficient thermistor to provide environmental temperature therefor,
    (b) means connected to said positive temperature coefficient thermistor for energizing said thermistor and thereby change said environmental temperature in response to changes in heat transfer to the surrounding medium, said rapidly increasing resistance of the positive temperature coefficient thermistor above said switching point temperature affording self-limiting power output and thereby avoiding damage to probe elements by excessive heat, and
    (c) means connected to said negative temperature coefficient thermistor and responsive to changes in its resistance caused by changes in condition of the medium surrounding said probe.

3. A device for detecting changes in fluid level comprising, in combination:
    (a) a probe adapted to be exposed to changes in fluid level on said probe, and including
        (i) a negative temperature coefficient thermistor having a characteristic of rapidly decreasing resistance with increasing temperature, and
        (ii) a positive temperature coefficient thermistor having a characteristic of substantially constant resistance below a switching point temperature and a rapidly increasing resistance with increasing temperature above a switching point temperature,
        (iii) said positive temperature coefficient thermistor being disposed in heat transfer proximity to said negative temperature coefficient thermistor and adapted to serve as a heating element for said negative temperature coefficient thermistor,
    (b) means for energizing said positive temperature coefficient thermistor to maintain said negative temperature coefficient thermistor at a fixed temperature when said probe is immersed and to rapidly raise the temperature of said negative temperature coefficient thermistor when the fluid level falls tending to expose said probe, the power output of said positive temperature coefficient thermistor being self-limiting due to increased resistance thereof upon increase in temperature of the probe, and
    (c) means connected to said negative temperature coefficient thermistor to detect changes in resistance theerof as the temperature of said probe changes when fluid level rises to immerse said probe and drops to expose said probe.

4. A device for detecting changes in condition of a surrounding cryogenic medium comprising, in combination:
    (a) a probe containing thermoelectric elements, including
        (i) a negative temperature coefficient thermistor having a characteristic of rapidly decreasing resistance with increasing temperature, and
        (ii) a postive temperature coefficient thermistor having a characteristic of substantially constant resistance below a switching point temperature and a rapidly increasing resistance with increasing temperature above said switching point temperature,
        (iii) said positive temperature coefficient thermistor being disposed in heat transfer proximity to said negative temperature coefficient thermistor to provide an environmental temperature therefor,
    (b) means for adjustably energizing said positive temperature coefficient thermistor to adjust said environmental temperature to a temperature lower than that of the surrounding medium at one condition of said medium, the rapid increase in resistance of the positive temperature coefficient thermistor affording self-limiting power output and thereby avoiding damage to probe elements by excessive heat, and
    (c) means connected to said negative temperature coefficient thermistor and responsive to changes in its resistance as its temperature changes with changes in condition of the medium surrounding said probe affecting heat transfer between said negative temperature coefficient thermistor and said positive temperature coefficient thermistor.

References Cited

UNITED STATES PATENTS

| | | | |
|---|---|---|---|
| 2,824,278 | 2/1958 | Johnston | 323—69 |
| 2,861,159 | 11/1958 | Seney | 137—392 |
| 2,924,234 | 2/1960 | Wilson | 137—392 |
| 2,926,299 | 2/1960 | Rogoff | 323—68 |
| 2,982,908 | 5/1961 | Erickson et al. | 323—69 |
| 3,029,354 | 4/1962 | Watkins | 307—117 |
| 3,049,887 | 8/1962 | Sharp et al. | 137—392 |

JOHN F. COUCH, *Primary Examiner.*

A. D. PELLINEN, *Assistant Examiner.*